(12) United States Patent
Anderson et al.

(10) Patent No.: US 10,798,724 B2
(45) Date of Patent: Oct. 6, 2020

(54) UPLINK RESOURCE SCHEDULING CONTROL IN RESPONSE TO CHANNEL BUSY CONDITION

(71) Applicant: BlackBerry Limited, Waterloo (CA)

(72) Inventors: Nicholas William Anderson, Exeter (GB); Eswar Vutukuri, Havant (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/531,293

(22) Filed: Aug. 5, 2019

(65) Prior Publication Data

US 2019/0364581 A1 Nov. 28, 2019

Related U.S. Application Data

(63) Continuation of application No. 14/824,723, filed on Aug. 12, 2015, now Pat. No. 10,375,714.

(51) Int. Cl.
*H04W 72/12* (2009.01)
*H04W 74/08* (2009.01)

(52) U.S. Cl.
CPC ... *H04W 72/1226* (2013.01); *H04W 72/1268* (2013.01); *H04W 74/0808* (2013.01)

(58) Field of Classification Search
CPC ..... H04L 5/001; H04L 5/0053; H04L 5/0048; H04L 27/0006; H04L 5/0055; H04L 1/1812; H04L 1/0003; H04L 5/0098; H04L 1/0009; H04L 1/1819; H04L 5/00; H04L 5/0091; H04L 1/0026; H04L 1/1887; H04L 27/2602; H04L 5/0051; H04L 1/0027; H04L 1/1822; H04L 27/2613; H04L 27/2692

See application file for complete search history.

(56) References Cited

U.S. PATENT DOCUMENTS

| | | | |
|---|---|---|---|
| 8,989,113 | B2 | 3/2015 | Mukherjee et al. |
| 2011/0141969 | A1 | 6/2011 | Sridhara |
| 2012/0163169 | A1 | 6/2012 | Yang et al. |
| 2014/0362780 | A1 | 12/2014 | Malladi |
| 2015/0092639 | A1 | 4/2015 | Jia et al. |
| 2015/0117368 | A1 | 4/2015 | Barriac |

(Continued)

FOREIGN PATENT DOCUMENTS

| | | | |
|---|---|---|---|
| EP | 3013109 A1 | 4/2016 | |
| EP | 3133888 A1 | 2/2017 | |

(Continued)

OTHER PUBLICATIONS

3GPP TSG-RAN WG2 #90, "RRM Measurements for LAA", Source: Ericsson, Tdoc R2-152480; Agenda item 7.12; Fukuoka, Japan, May 25-29, 2015, 6 pages.

(Continued)

*Primary Examiner* — Natasha W Cosme
(74) *Attorney, Agent, or Firm* — Trop, Pruner & Hu, P.C.

(57) ABSTRACT

A wireless access network node transmits scheduling information assigning an uplink resource for a user equipment (UE), detects whether the UE has not transmitted using the assigned uplink resource, determines, based on the detecting, that the UE has failed a Listen-Before-Talk (LBT) check at the UE, and further schedules and assigns an uplink resource for the UE.

20 Claims, 8 Drawing Sheets

(56) References Cited

U.S. PATENT DOCUMENTS

| | | | |
|---|---|---|---|
| 2016/0119922 A1* | 4/2016 | Ye | H04W 74/004 370/336 |
| 2016/0316474 A1 | 10/2016 | Merlin | |
| 2018/0124749 A1* | 5/2018 | Park | H04W 16/14 |

FOREIGN PATENT DOCUMENTS

| | | |
|---|---|---|
| WO | 2014084766 | 6/2014 |
| WO | 2016144216 A1 | 9/2016 |

OTHER PUBLICATIONS

IEEE Standard for Information Technology—Telecommunications and Information Exchange Between Systems, Local and Metropolitan Area Networks, Specific Requirements, Part 11: Wireless LAN Medium Access Control (MAC) and Physical Layer (PHY) Specifications; Sponsored by LAN/MAN Standards Committee; IEE Std 802.11TM-2012, (Revision of IEE Std 802.11-2007); New York, New York; Mar. 2012; pp. 1-1162.

IEEE Standard for Information Technology—Telecommunications and Information Exchange Between Systems, Local and Metropolitan Area Networks, Specific Requirements, Part 11: Wireless LAN Medium Access Control (MAC) and Physical Layer (PHY) Specifications; Sponsored by LAN/MAN Standards Committee; IEE Std 802.11TM-2012, (Revision of IEE Std 802.11-2007); New York, New York; Mar. 2012; pp. 1163-2695.

Wikipedia; "Hidden Node Problem," https://en.wikipedia.org/wiki/Hidden_node_problem; Aug. 4, 2015, 4 pages.

ETSI EN 301 893 V1.7.1, Harmonized European Standard; Broadband Radio Access Networks (BRAN); 5 GHz High Performance RLAN; Harmonized EN Covering the Essential Requirements of Article 3.2 of the R&TTE Directive dated at least as early as Nov. 24, 2014; pp. 1-45.

ETSI EN 301 893 V1.7.1, Harmonized European Standard; Broadband Radio Access Networks (BRAN); 5 GHz High Performance RLAN; Harmonized EN Covering the Essential Requirements of Article 3.2 of the R&TTE Directive dated at least as early as Nov. 24, 2014; pp. 46-90.

Joey Padden, CableLabs; Wi-Fi vs. EU LBT: Houston, we have a problem; https://www.cablelabs.com/wi-fi-vs-eu-lbt-houston-we-have-a-problem; Aug. 12, 2015; 10 pages.

3GPP TR 36.889 V13.0.0; 3rd Generation Partnership Project; Technical Specification Group Radio Access Network; "Study on Licensed-Assisted Access to Unlicensed Spectrum"; Release 13; Jun. 2015; 285 pages.

3GPP TS 36.213 V12.6.0; 3rd Generation Partnership Project; Technical Specification Group Radio Access Network; Evolved Universal Terrestrial Radio Access (E-UTRA); "Physical Layer Procedures"; Release 12; Jun. 2015; 241 pages.

Takashi Suzuki; U.S. Appl. No. 14/542,414; Sharing Channels in a Licensed-Assisted Access in Long Term Evolution Operation; filed Nov. 14, 2014; 57 pages.

3GPP TSG RAN WG1 Meeting #80, Athens, Greece, R1-150507, Agenda Item: 7.2.3.3, Source: Intel Corporation, Title: On the LAA uplink: scheduling, LBT, and HARQ, Document for: Discussion and Decision, Feb. 9-13, 2015 (4 pages).

3GPP TSG RAN WG1 Meeting #79, San Francisco, USA, R1-144955, Source: Kyocera, Title: Further considerations on the essential functionalities for LAA, Agenda Item: 6.3.2.2, Document for: Discussion/Decision, Nov. 17-21, 2014 (10 pages).

3GPP TSG RAN WG1 Meeting #79, San Francisco, USA, R1-144830, Agenda Item: 6.3.2.2, Source: ZTE, Title: Analysis of LAA UL enhancement, Document for Discussion and Decision, Nov. 17-21, 2014 (5 pages).

European Patent Office, Extended European Search Report for Appl. No. 16834359.8 dated Feb. 11, 2019 (12 pages).

Canadian Intellectual Property Office, International Search Report and Written Opinion for PCT/CA2016/050930 dated Oct. 13, 2016 (7 pages).

* cited by examiner

UPLINK RESOURCE SCHEDULING CONTROL IN RESPONSE TO CHANNEL BUSY CONDITION

CROSS REFERENCE TO RELATED APPLICATION

This is a continuation of U.S. application Ser. No. 14/824,723, filed Aug. 12, 2015, U.S. Pat. No. 10,375,714, which is hereby incorporated by reference.

BACKGROUND

Devices such as computers, handheld devices, or other types of devices can communicate over wired or wireless networks. Wireless networks can include cellular networks that include cells and associated wireless access network nodes. A wireless device within a cell can connect to a corresponding wireless access network node to allow the device to communicate with other devices.

Another type of wireless network is a wireless local area network (WLAN), which includes wireless access points to which devices are able to wirelessly connect.

BRIEF DESCRIPTION OF THE DRAWINGS

Some implementations of the present disclosure are described with respect to the following figures.

DETAILED DESCRIPTION

Figure 1:
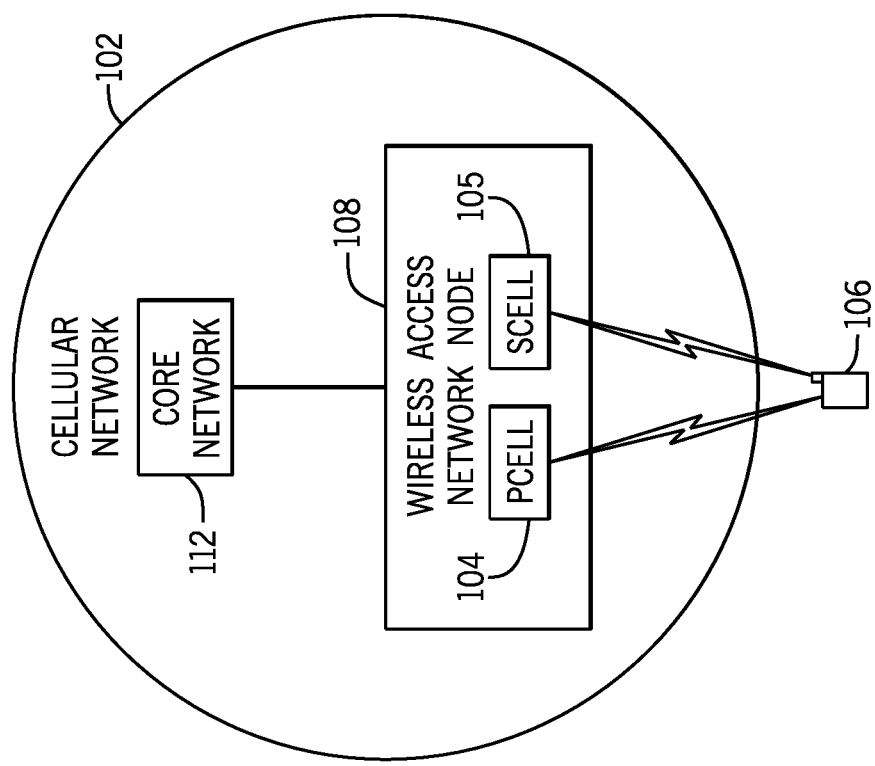
FIG. 1 is a block diagram of an example arrangement that each includes a cellular network including a wireless access network node configured to operate in the licensed spectrum and in the unlicensed spectrum, in accordance with some implementations.

FIG. 1 illustrates an example of a network arrangement that includes a cellular network 102 and a user equipment (UE) 106 that is at a location within the coverage area of a wireless access network node 108 in the cellular network 102.

A UE can refer to any of the following: a computer (e.g. desktop computer, notebook computer, tablet computer, server computer, etc.), a handheld device (e.g. a personal digital assistant, smartphone, etc.), a wearable device that can be worn on a person, a computer embedded in a vehicle or appliance, a storage device, a communication node, and so forth.

The wireless access network node 108 can operate according to the Long-Time Evolution (LTE) standards (or other standards) as provided by the Third Generation Partnership Project (3GPP). The LTE standards are also referred to as the Evolved Universal Terrestrial Radio Access (E-UTRA) standards. Although reference is made to LTE or E-UTRA in the ensuing discussion, it is noted that techniques or mechanisms according to some implementations can be applied to other wireless access technologies, such as 5G (fifth generation) or other technologies. The UE 106 can communicate with the wireless access network node 108 over a cellular network link 109.

Although just one wireless access network node 108 is depicted in FIG. 1, it is noted that the cellular network 102 can include multiple cellular access network nodes that correspond to respective cells of the cellular network 102. A cell can refer to the coverage area provided by a corresponding cellular access network node. UEs can move between cells and connect to respective cellular access network nodes.

Cellular network operators that provide cellular networks in a licensed spectrum are running out of new spectrum to purchase, and the spectrum that is available can be costly to license. Thus cellular network operators are looking for ways to extend cellular networks to use unlicensed spectrum. An unlicensed spectrum includes frequencies that are not part of the licensed spectrum for a given cellular network. For example, LTE can be associated with a specific licensed spectrum that includes frequencies over which LTE communications can occur. An unlicensed spectrum includes frequencies outside the LTE licensed spectrum, e.g. frequencies currently used by a wireless local area network (WLAN) that operates according to the Institute of Electrical and Electronics Engineers (IEEE) 802.11 standards. Note that a WLAN that operates according to the 802.11 standards can also be referred to as a Wi-Fi network. In other examples, a WLAN can operate to different standards.

One way to increase the capacity in the cellular network 102 is to aggregate multiple operating frequencies or carriers in a single cell. This feature is referred to as carrier aggregation as provided by LTE. Carrier aggregation enables simultaneous operation over a number (N) of aggregated component carriers (CCs). Each given CC may be up to 20 megahertz (MHz) wide, and can be present either within the same or a different band of other CCs with which the given CC is aggregated.

In a carrier aggregation made up of multiple CCs, one of the multiple CCs provides a primary cell or PCell, while the remaining CC(s) of the carrier aggregation provide(s) secondary cell(s) or SCell(s). Certain operations may be confined to the PCell (for example transmission of broadcast system information). The wireless access network node 108 is responsible for scheduling uplink and downlink shared resources on the CCs. Examples of uplink shared resources include Physical Uplink Shared Channel (PUSCH) resources, and examples of downlink shared resources include Physical Downlink Shared Channel (PDSCH) resources. The PUSCH is used for uplink communications (from the UE 106 to the wireless access network node 108), while the PDSCH is used for downlink communications (from the wireless access network node 108 to the UE 106). Scheduling assignments for PUSCH or PDSCH resources can be contained within Downlink Control Information (DCI) messages that are transmitted within either a Physical Downlink Control Channel (PDCCH) or an Enhanced Downlink Physical Control Channel (E-PDCCH). These scheduling assignments may be directed to a specific UE via use of a UE-specific address termed a Radio Network Temporary Identifier (RNTI). The scheduling assignments identify PDSCH or PUSCH resources for a given CC (here termed the "target" CC). The CC that is used to transmit the assignments (here termed the "controlling CC" may be either the same as the target CC (in which case this mechanism is known as self-scheduling) or a different CC (known as cross-carrier scheduling).

As the licensed spectrum gets more crowded, carrier aggregation of licensed carriers alone is not sufficient to meet the bandwidth demands in a network. A further way to expand the capacity of a cellular network is to make use of both the licensed spectrum and an unlicensed spectrum. With carrier aggregation, this may be accomplished by aggregating carriers in the licensed spectrum with carriers in the unlicensed spectrum. In some cases, this can be accomplished by adapting the LTE cellular network to operate both in the licensed spectrum and the unlicensed spectrum. The wireless access network nodes are able to serve the UEs both over licensed and unlicensed carriers using an adapted LTE technology. As part of Rel-13 enhancements of LTE, 3GPP are studying deployment of LTE in unlicensed spectrum. The general idea is that this technology follows the carrier aggregation framework as mentioned above where the PCell is in the licensed spectrum and one or more SCells may be in the unlicensed spectrum. Adding SCells in the unlicensed spectrum to add to the communications capacity of an LTE cellular network is referred to as LTE Licensed Assisted Access (LAA).

As shown in FIG. 1, the wireless access network node 108 provides a PCell 104 on a CC in the licensed spectrum, and provides an SCell 105 on a CC in the unlicensed spectrum, where the PCell 104 and the SCell 105 are part of a carrier aggregation.

The UE 106 can communicate over the uplink (UL) and downlink (DL) with each respective PCell 104 and SCell 105.

In an E-UTRA network, the wireless access network node 108 can be implemented as an enhanced Node B (eNB), which includes the functionalities of a base station and base station controller. In the ensuing discussion, the cellular access network node 108 is also interchangeably referred to as an eNB 108. Although reference is made to eNBs in the ensuing discussion, it is noted that techniques or mechanisms according to the present disclosure can be applied with other types of cellular network wireless access network nodes that operate according to other protocols.

The cellular network 102 also includes a core network 112, which includes various core network nodes. As examples, in an E-UTRA network, the core network nodes can include a serving gateway (SGW) and a packet data network gateway (PDN-GW). The SGW routes and forwards traffic data packets of a UE served by the SGW. The SGW can also act as a mobility anchor for a user plane during handover procedures. The SGW provides connectivity between the UE and an external network (such as a packet data network, e.g. the Internet or another network). The PDN-GW is the entry and egress point for data communicated between a mobile in the E-UTRA network and a network element coupled to a PDN (not shown).

In an E-UTRA network, the core network nodes can also include a control node referred to as a mobility management entity (MME). An MME is a control node for performing various control tasks associated with an E-UTRA network.

For example, the MME can perform idle mode UE tracking and paging, bearer activation and deactivation, selection of a serving gateway) when a UE initially attaches to the E-UTRA network, handover of the UE between eNBs, authentication of a user, generation and allocation of a temporary identity to a UE, and so forth. In other examples, the MME can perform other or alternative tasks.

When connected to the eNB 108, the UE 106 is able to communicate with other devices, which can be connected to the cellular network 102 or can be connected to other networks, including wired and/or wireless networks.

Traditionally, for UL communications in a cellular network such as an LTE network, access to radio resources (to use for an UL communication from a UE to the eNB 108) is accomplished using dynamic scheduling controlled by the cellular network 102, and more specifically, by the eNB 108. More specifically, the eNB 108, to schedule an UL communication, the eNB 108 provides a grant of UL radio resources to the UE 106 to use for performing the UL communication.

In contrast, a WLAN that operates according to IEEE 802.11 uses a distributed method of medium access based on a Listen-Before-Talk (LBT) technique. The LBT technique can also be referred to as a Channel Sense Multiple Access (CSMA) technique.

With the LBT technique, a wireless node (e.g. UE 106 or a wireless access point or AP of a WLAN) with data to transmit first listens to the medium (on the channel the wireless node wishes to operate on) for a period of time to sense whether the channel is free for use. Listening to the channel to sense whether the channel is free for use is also referred to as Clear Channel Assessment (CCA) or Carrier Sense (CS). A "channel" can refer to any communication resource (e.g. a carrier of a given frequency, a time slot, etc.) that can be used for carrying information (e.g. user date or control signaling) to be transmitted by the wireless node. A channel is free if there is not another wireless node that is currently transmitting on the channel. A channel is busy (not free) if there is another wireless node currently transmitting on the channel.

The determination of whether the channel is free or busy may be based on a comparison of a received signal metric (such as power) against a specified threshold value. If the wireless node determines that the channel is free, the wireless node can proceed to transmit for a period of time, which can be referred to as a Transmission Opportunity (TXOP). The TXOP is less than a defined maximum TXOP (a maximum time duration). Conversely, if the wireless node determines that the channel is busy (not free), the wireless node does not transmit and executes a procedure to choose a random time (a backoff time) to attempt transmission again. A state of the wireless node in which the wireless node does not transmit for the backoff time is referred to as a backoff state or extended CCA (eCCA) state. During the backoff state, the device makes use of various timers and counters that govern how long the device remains in the backoff state.

When LAA is employed using SCells operating on unlicensed frequencies, co-channel coexistence of cellular network eNBs and WLAN APs can be improved if the LBT technique is employed also for communications between UEs and eNBs (in addition to using LBT for communications between UEs and WLAN APs). In these arrangements, a UE or an eNB with data to transmit first senses the channel, and then proceeds to either transmit (if the channel is free) or to back off and re-try at a later time (if the channel is busy). Various LBT protocols variants are divided into 4 categories:

Category 1: No LBT is used.

Category 2: LBT is used without backoff (but with a deterministic duration to detect channel-busy prior to transmission). Note that schemes in which this duration periodically recurs (e.g. the Frame Based Equipment (FBE) definition of ETSI's EN 301 893) also fall into this category.

Category 3: LBT with backoff within a fixed-size time (contention window). This means that the backoff period includes a randomly determined period of time (provided by a backoff timer or counter) up to the contention window length. An LBT backoff state when Category 3 LBT is used is also referred to as a random backoff state. During the random backoff state, the wireless node that is in backoff performs further channel sensing in order to decrement the backoff counter or timer upon detecting an idle backoff slot. Because of this additional channel sensing, this backoff state is also referred to as an eCCA state.

Category 4: LBT with backoff within a variable-sized contention window (e.g. one that grows based on each successive retry). This is similar to the above random backoff state with Category 3 LBT, but the contention window in this case may be adapted (typically incremented by a factor) after sensing an unsuccessful transmission or other events indicating that the channel is congested.

LAA has adopted use of Category 4 LBT. Note that when in an eCCA state, the backoff counter only decrements upon identifying an idle ECCA slot (discussed further below in connection with FIG. 6).

Since LTE is a scheduled system in which UL resources are scheduled to allow UEs to perform UL communications, LAA can also use scheduling of UL resources. In accordance with some implementations of the present disclosure, techniques or mechanisms are provided to allow for coexistence of a scheduled LAA UL and communications based on using LBT. More specifically, an eNB can transmit UL grant to schedule an UL resource to a UE to perform an UL communication; if the UL resource scheduled by the UL grant is part of an unlicensed spectrum, then an UL transmission with the UL resource is subject to LBT.

Using LBT at a UE (i.e. the UE uses LBT before transmission to detect a free channel) can be performed for a number of reasons. For example, LBT before transmission can be a regulatory requirement in some regions such as Europe. As another example, issues due to coexistence between WLAN nodes and scheduled systems can be addressed if the UE performs LBT (and more specifically, LBT with random backoff within a variable-sized contention window that grows on each successive retry) before transmission. As a further example, hidden nodes to an eNB (nodes that are hidden from the eNB, i.e. nodes for which the eNB is unable to detect wireless transmissions from the nodes) would not be impacted by UE transmissions if the UE performs LBT before transmission.

However, simply combining a scheduled system with LBT at the UE can lead to situations in which the eNB is not aware of:
the UE's current LBT or backoff state, and/or
the presence of hidden nodes associated with the UE for which the eNB is scheduling uplink resources, where a hidden node is a node that the UE can hear and will interfere with while this node is not within the CCA range of the eNB).

The above can both cause the following specific issues:

Issue 1: The eNB cannot optimize its scheduling and may assign wasted UL grants when the UE is unable to transmit in the UL (e.g. when the UE is in backoff state due to ongoing transmissions from other nodes that are hidden to the eNB).

Issue 2: Coexistence problems and lack of fair sharing can occur if an appropriate LBT technique including backoff is not adopted (especially in the presence of hidden nodes).

Figure 2:
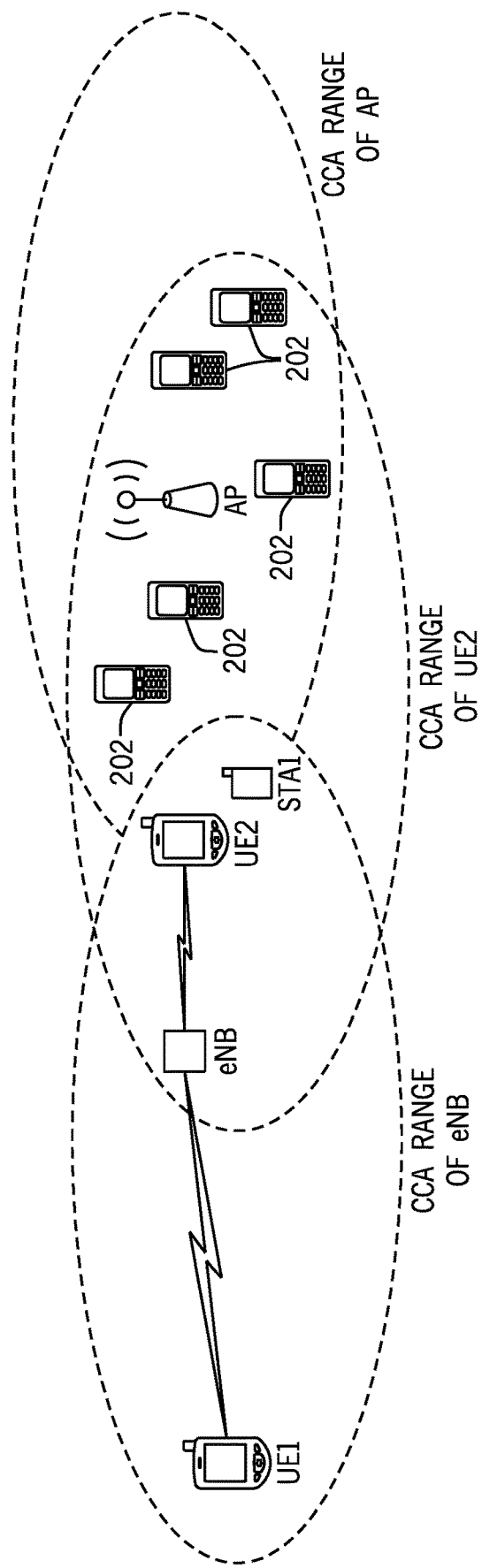
FIG. 2 is a block diagram of an example arrangement in which techniques or mechanisms according to some implementations can be incorporated.
Figure 3:
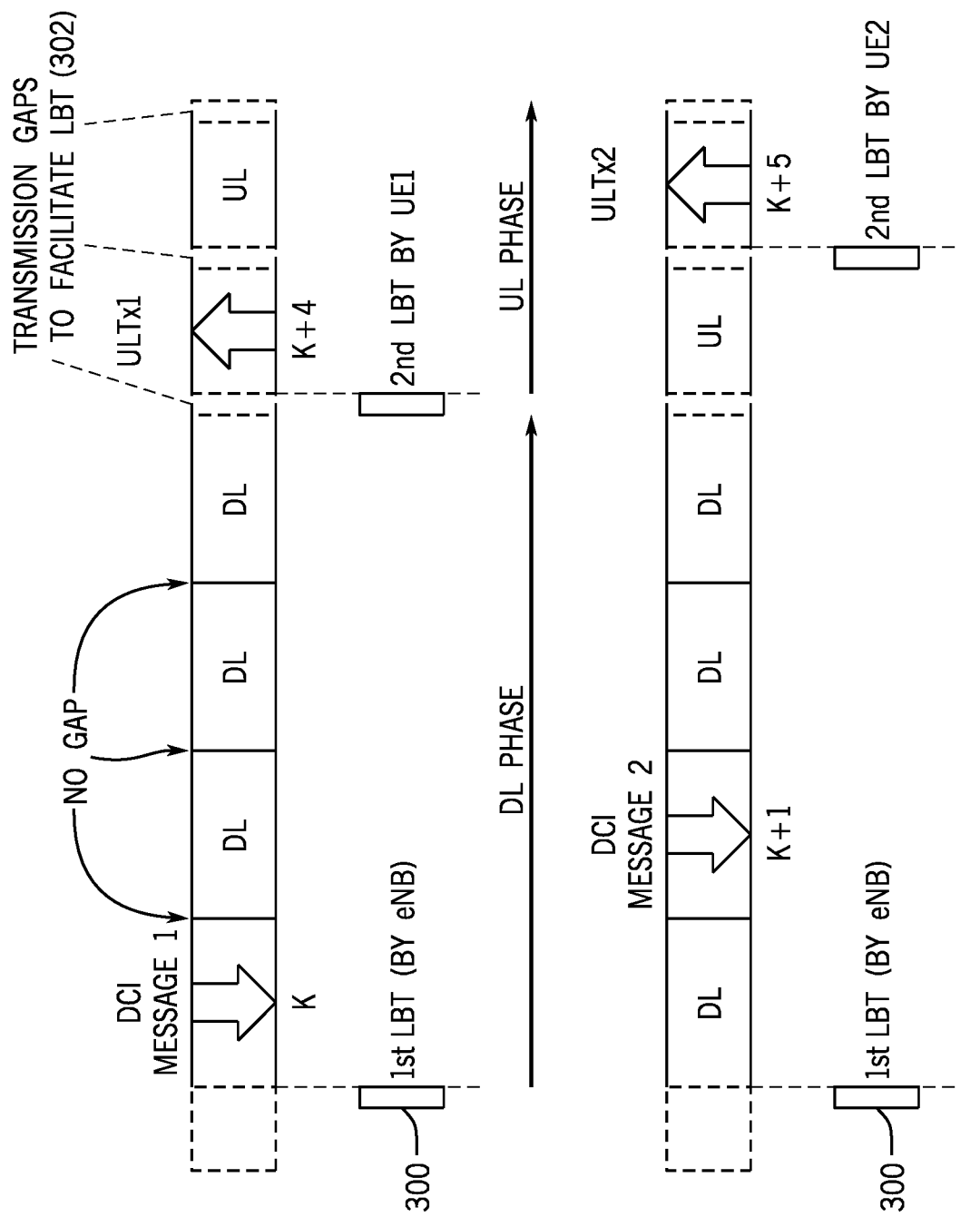
FIG. 3 is a schematic diagram illustrating downlink and uplink subframes according to some implementations.

Issue 2 is discussed further in the context of an example arrangement according to FIG. 2 and an example diagram showing messages sent in respective subframes in FIG. 3. FIG. 2 shows an eNB and a WLAN AP, and various UEs. UE1 and UE2 have established connections with the eNB, while several other wireless nodes 202 (including STA1) communicate with the AP.

FIG. 2 also show respective CCA ranges of the eNB, UE2, and AP. A CCA range can refer to the distance from the respective node (eNB, UE2, or AP) within which the transmission of another wireless node can be detected when performing LBT. In the example of FIG. 2, node STA1 is within the CCA range of the eNB and UE2, but outside the CCA range of UE1. Therefore, node STA1 is a hidden node to UE1. Nodes 202 are outside the CCA range of the eNB, and thus are hidden nodes to the eNB. Nodes 202 are also outside the CCA range of UE1, and thus are hidden nodes to UE1. However, nodes 202 and the AP are within the CCA range of UE2.

As shown in FIG. 3, it is assumed that the eNB performs an LBT check (at 300) before transmitting on DL and this includes transmission of DL frames, e.g. Downlink Control Information (DCI) message 1 and DCI message 2, containing UL grants. DCI message 1 sent by the eNB includes an UL grant to UE1 (to perform UL transmission in subframe K+4), and DCI message 2 sent by the eNB includes an UL grant to UE2 (to perform UL transmission in subframe K+5). Note that the eNB performed a first LBT that was successful, which allowed the eNB to transmit DCI message 1 and DCI message 2 in subframes K and K+1, respectively, during the DL phase.

In the example arrangement of FIG. 2 where there are hidden nodes, the LBT at UE2 may detect one or more transmissions from nodes (e.g. 202) that are hidden to the eNB. These nodes 202 that are hidden to the eNB may initiate UL transmissions even during the eNB's DL phase.

Further, in the example scenario shown in FIGS. 2 and 3, it is assumed that UE1's LBT succeeds, in which case UE1 starts an UL transmission in the scheduled UL subframe K+4. Also, it is assumed that UE2's LBT succeeds, in which case UE2 starts an UL transmission in the scheduled UL subframe K+5. Transmission gaps 320 are provided as shown in FIG. 3 to facilitate performance of LBT by the respective UEs. More specifically, a transmission gap is provided between the end of the last subframe in the DL phase and the start of subframe K+4, a transmission gap is provided between the end of subframe K+4 and the start of subframe K+5, and so forth.

At the time that UE1 performs an UL transmission in subframe K+4, the DL phase of the eNB has ended (i.e. the eNB has stopped DL transmissions); as a result, any of the hidden nodes to UE1 (i.e. those that are out of CCA range from UE1 but potentially in range of eNB and/or UE2) may also sense the channel to be idle and initiate the hidden nodes' own UL transmissions. For example, STA1 (e.g. a Wi-Fi node communicating with the AP) can sense the channel to be idle during subframe K+4 and start an UL transmission sometime after the end of the preceding DL phase. This transmission from STA1 can continue into subframe K+5, in which case, the reliability of UE2's transmission on scheduled subframe (i.e. subframe K+5) can be impaired at the eNB receiver (in other words, the UL transmission by STA1 can interfere with the eNB's reception of the UL transmission from UE2).

Additionally, if UE2 transmits without any CCA check prior to scheduled UL subframe K+5 (i.e. UE2 does not perform LBT), then the UL transmission from UE2 may impact the ongoing transmission from STA1 (which is a hidden node to UE1) as received by the AP, leading to coexistence issues. Note that in this example, all the nodes communicating with the AP (including the AP itself) are hidden to UE1 and hence in theory any of these nodes can initiate a transmission after the DL phase has ended, leading to similar issues.

As depicted in the example according to FIGS. 2 and 3, Issue 2 discussed above is more acute when the eNB schedules multiple successive UL subframes for respective UEs.

The foregoing issues can be addressed using any or some combination of the techniques or mechanisms discussed below.

Scheduling Control Based on Channel Busy Condition

Figure 4:
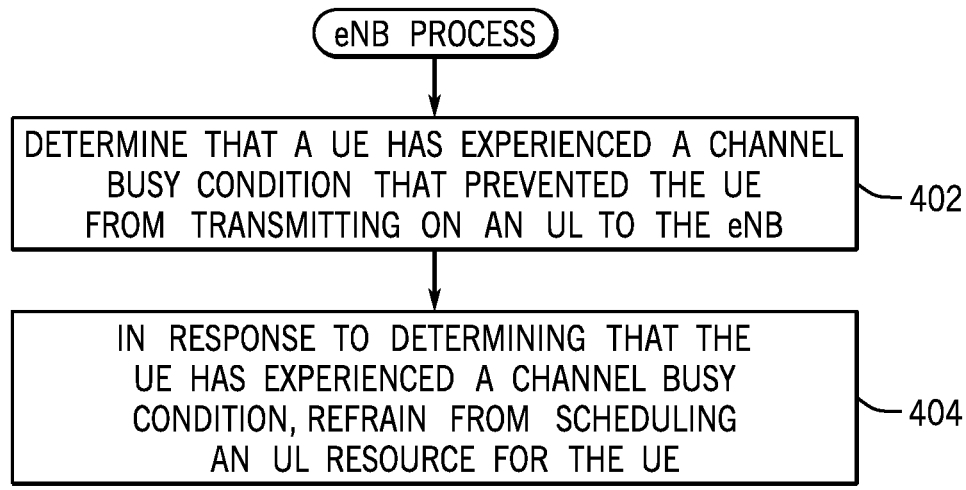
FIG. 4 is a flow diagram of a process of a wireless access network node, according to some implementations.

FIG. 4 is a flow diagram of an example process that can be performed by an eNB (and more generally the wireless access network node 108) to allow for proper operation of UL scheduling by the eNB while allowing for use of an LBT technique for detecting whether a channel is busy.

According to FIG. 4, the eNB determines (at 402) that a UE has experienced a channel busy condition related to an UL resource that prevented the UE from transmitting on the UL resource to the eNB. The detection of the UE experiencing a channel busy condition can be based on use of an LBT technique, such as discussed above, in some examples.

In response to determining that the UE has experienced a channel busy condition, the eNB refrains (at 404) from scheduling an UL resource for the UE.

The determination (at 402) of a channel busy condition can be referred to as channel sensing, while the refraining (at 404) can be referred to as performing backoff.

In some example solutions, the channel sensing and the back-off can be performed in separate nodes; for example, the channel sensing can be performed at the UE, while the back-off can be performed at the eNB.

In further example solutions, the UE can explicitly indicate a status of a state of channel sensing to the eNB.

In additional example solutions, an LBT technique can be adjusted based on whether or not hidden nodes are detected.

Channel Sensing and Back-Off Performed in Separate Nodes

Traditionally, channel sensing (or LBT before transmission on a channel) and execution of backoff in response to detecting a channel busy condition are both performed by a wireless node that has data to transmit, or are both performed by another node that is able to contend on behalf of the wireless node and donate (or schedule) all or part of the obtained transmission opportunity to the wireless node.

In contrast, according to some implementations of the present disclosure, the initial channel sensing can be performed at the UE, while the backoff can be performed at the eNB. Initial channel sensing can refer to the first channel sensing performed by a wireless node prior to transmission. It is noted that in a backoff procedure at a wireless node (performed in response to detecting a channel busy condition), further channel sensing can be performed to determine whether a channel is free.

In an example implementation, the eNB can transmit an UL grant (e.g. using a DCI message on a Physical Downlink Control Channel (PDCCH) or Enhanced Physical Downlink Control Channel (E-PDCCH)) during subframe K. The UL assigns UL resources to the UE for its use in a later subframe K+M. In some examples, transmission of the DCI message follows execution of LBT at the eNB for DL transmission, such as by using Category 4 LBT in the self-scheduling case) or by use of cross-carrier grants in which the scheduling carrier is in the licensed spectrum (and hence not subject to LBT) while the carrier scheduled to carry the UL transmission is in the unlicensed spectrum. Category 4 LBT can refer to LBT with random backoff within a variable-sized contention window (e.g. one that grows based on each successive retry).

The following describes example operations in response to an UL grant from the eNB. The UE receives the UL grant in subframe K. Just prior to transmission in the assigned subframe K+M, the UE performs a CCA check to perform initial channel sensing and ascertain whether the channel is busy or free. If the channel is free, the UE performs an UL transmission in the assigned subframe K+M. The eNB detects the presence of the UL transmission, receives the UL transmission, and decodes UL data in the UL transmission.

On the other hand, if the UE detects that the channel is busy, the UE refrains from transmitting during the assigned interval K+M. The eNB can implicitly determine that the UE has failed its LBT check (i.e. UE detected an ongoing transmission having a transmit power above a CCA threshold, which is a predetermined power threshold), or alternatively, the eNB can be provided with an explicit indication that the UE has failed its LBT check.

The eNB can detect that the UE has not transmitted, for example by checking a received signal power or signal to interference ratio. As examples, the eNB can check a Received Signal Strength Indication (RSSI), a Received Signal Reference Power (RSRP), a Signal to Noise (SNR) ratio, a Signal to Interference plus Noise Ratio (SNIR), or another indication. Alternatively, the eNB can perform channel estimation processing based on processing of demodulation reference signals (DMRS) known to be associated within the UEs UL transmission. The foregoing checks allow the eNB to determine that the UE has not transmitted an expected signal in its scheduled UL subframe (scheduled UL resource), and therefore, the eNB can conclude that the UE has failed its LBT check.

In alternative examples, the eNB can detect that the LBT check at the UE has failed by receiving an explicit indication of LBT failure transmitted by the UE. The UE may transmit such an indication using any of the following:

A Radio Resource Control (RRC) message.
A MAC control element.
A physical layer indication such as a Scheduling Request (SR), a Physical Uplink Control Channel (PUCCH) acknowledge or negative acknowledge (ACK/NACK); a Channel Quality Indication (CQI) (e.g. using a specific code-point), or any other indication.
Any other indication that the UE may transmit autonomously (i.e. without explicit scheduling from the eNB).

In response to determining (implicit determination or explicit determination) that the UE has failed its LBT check, the eNB can execute an LBT backoff procedure on behalf of the UE. This may include an eNB maintaining UL LBT timers or counters for each UE (in other words, the eNB can maintain multiple sets of LBT timers or counters for respective multiple UEs).

In accordance with some implementations, the LBT check is performed by the UE, while the eNB executes the backoff procedure on behalf of the UE.

Performing the LBT check at the UE can help to avoid the hidden node issue of interference of node A's reception of a transmission from node B due to transmission of the UE to an eNB, in an example where node B is hidden from the eNB but node A is in the range of the UE. More specifically, if node B is within range of the UE, the UE can sense node B's transmission during the UE's LBT check, and not transmit if the LBT check detects node B's transmission, thereby avoiding interference with reception of node B's transmission at node A.

Figure 5:
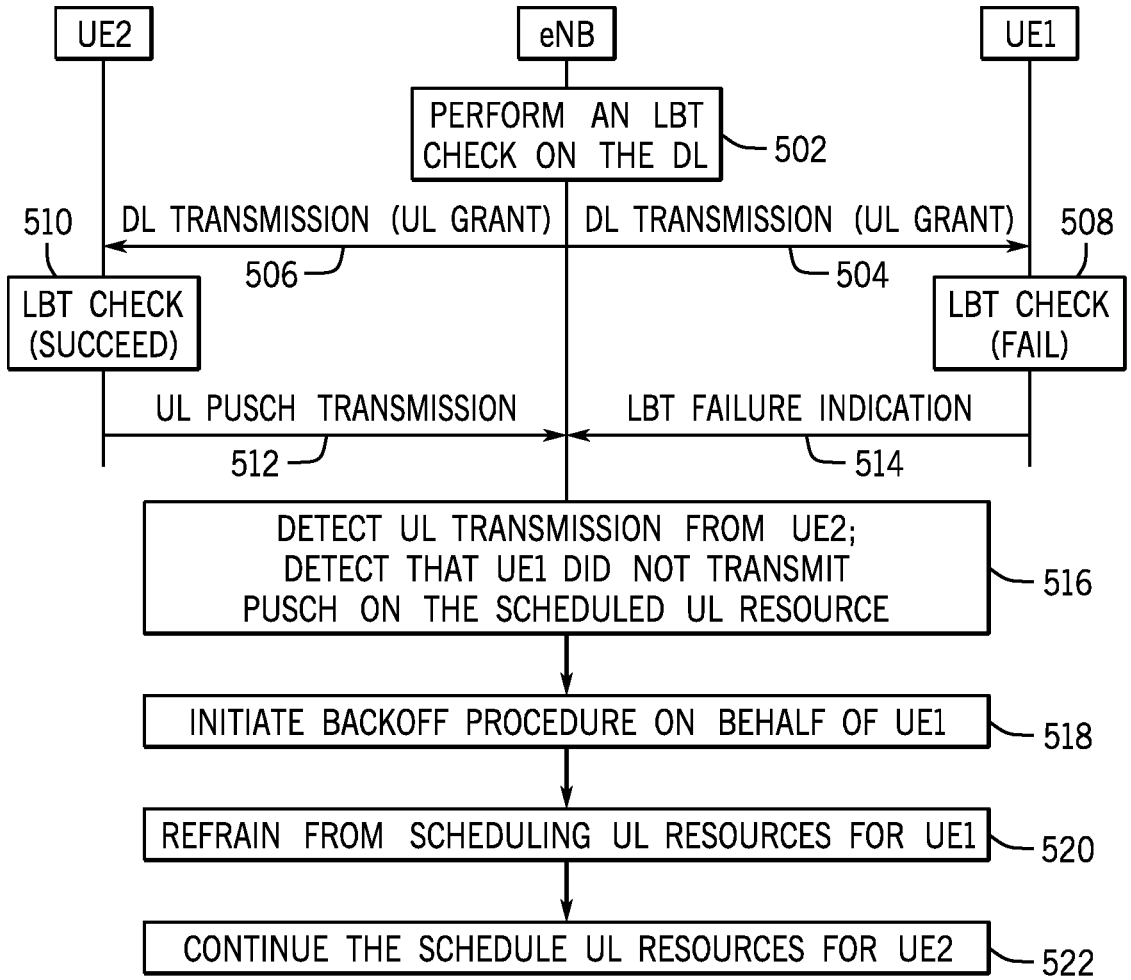
FIG. 5 is a message flow diagram of an example process that involves a wireless access network node and user equipments (UEs), according to some implementations.

As further shown in FIG. 5, for the purpose of sending DL information to UEs (e.g. UE1 and UE2 in FIG. 5), an eNB performs (at 502) an LBT check on the DL. If the LBT performed at the eNB succeeds (which means that the channel is free), then the eNB performs a DL transmission (at 504) to UE1, and performs a DL transmission (at 506) to UE2. The DL transmission (at 504) includes an UL grant to UE1, while the DL transmission (at 506) includes an UL grant to UE2.

In response to the UL grant (received at 504), UE1 performs an LBT check (at 508) prior to transmission in the scheduled UL subframe. It is assumed that UE1's LBT check fails due to another transmission from another node that exceeds the CCA threshold. In response to the UL grant (received at 506), UE2 performs an LBT check (at 510) prior to transmission in the scheduled UL subframe. It is assumed that UE2's LBT check succeeds.

Since UE2's LBT check succeeded, UE2 transmits (at 512) UL data in a Physical Uplink Shared Channel (PUSCH) in the scheduled UL subframe.

However, since UE1's LBT check failed, UE1 does not transmit PUSCH data in the scheduled UL subframe. In some examples, UE1 can transmit (at 514) an LBT state indication such as a short control message to indicate that the LBT check failed (i.e. the LBT check detected an ongoing transmission, such as from a hidden node). Further details regarding indications for indicating LBT states are discussed further below.

In general, the LBT state indication may either be sent on an UL carrier in the unlicensed spectrum (e.g. the same carrier on which the LBT check failed) or on an UL carrier in the licensed carrier, such as a carrier provided by a primary cell (PCell) in which LBT checking does not have to be performed. However, in some examples, an LBT state indication should be sent on the PCell (licensed carrier) in order not to interfere with the ongoing transmission detected in the unlicensed spectrum. If transmitted in the unlicensed spectrum, the LBT state indication should be relatively short. A new short signaling indication can be used for the LBT state indication, or alternatively an existing indication may be modified or reused to provide the LBT state indication.

As further shown in FIG. 5, the eNB detects (at 516) the UL transmission from UE2, and further detects (at 516) that a scheduled UE (UE1) has not transmitted PUSCH on the scheduled UL resource by either (a) implicitly detecting an absence of transmission from UE1 (e.g. detecting discontinuous transmission or DTX) on the UL PUSCH resource; or (b) explicitly receiving an indication of LBT failure (or busy channel detection) from UE1.

In response to detecting that UE1 did not transmit PUSCH on the scheduled UL resource, the eNB initiates (at 518) a backoff procedure on behalf of UE1, and the eNB further refrains (at 520) from scheduling UL resources of the associated unlicensed carrier for UE1 until the backoff procedure ends.

Note that since the eNB detected the PUSCH transmission from UE2, the eNB continues (at 522) to schedule UL resources for UE2.

Figure 6:
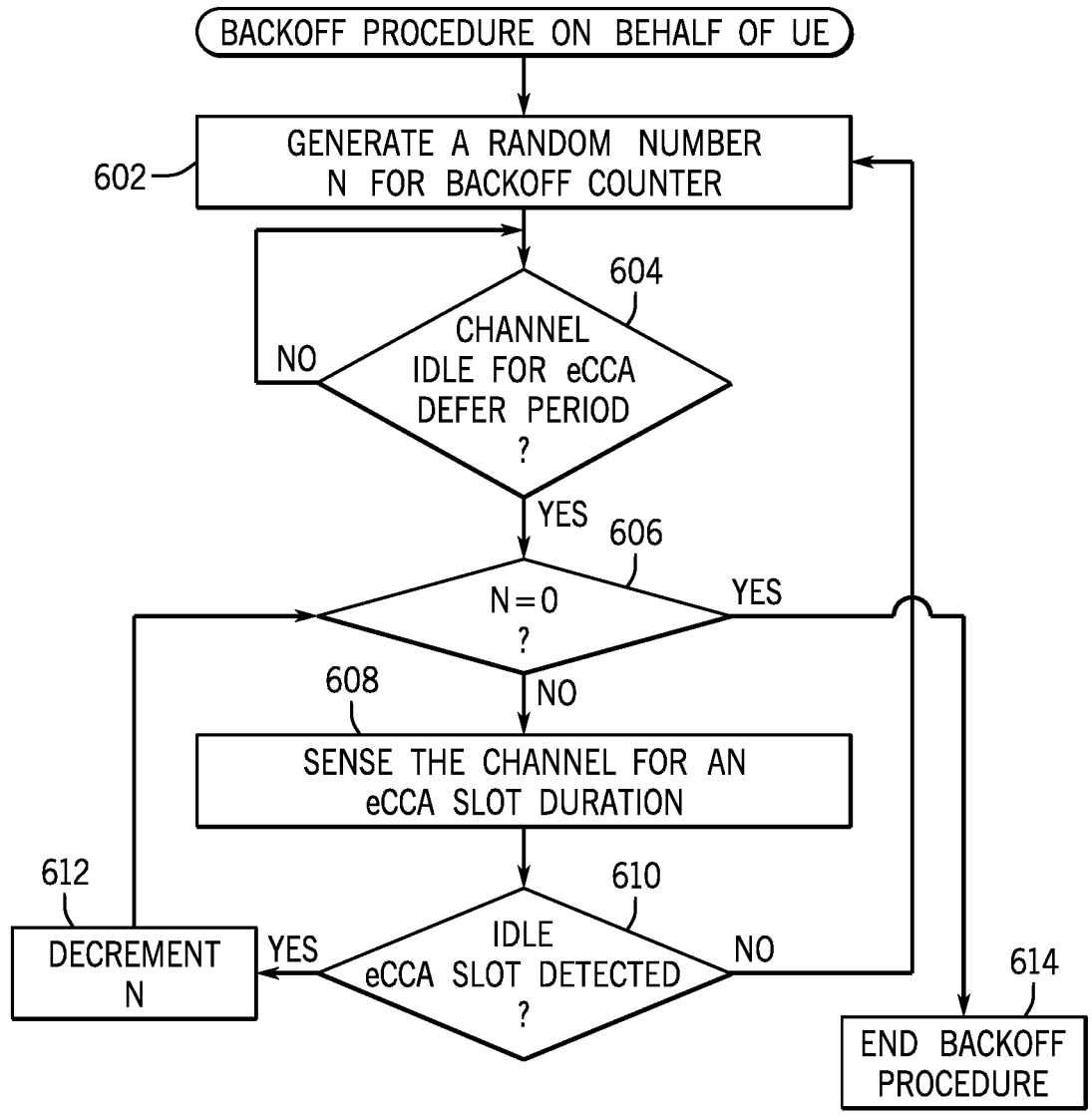
FIG. 6 is a flow diagram of a backoff procedure, according to some implementations.

As shown in FIG. 6, as part of the backoff procedure on behalf of UE1, the eNB can generate (at 602) a random number N, and then initiate the backoff procedure. The random number N is used to determine the length of the backoff time. The random number N is used as a starting value of a decrementing backoff counter, which decrements N to count down from the generated random number N. The eNB does not exit the backoff state until the backoff counter has counted down to zero. More generally, the backoff procedure can initialize a backoff timer to a non-zero value, where the backoff timer can be implemented as a counter or a variable that can be decremented after each backoff time slot.

The eNB determines (at 604) whether the channel (over which UE1 is to perform UL transmission) has been idle for a specified eCCA defer period, which is a specified period. If the channel has been idle for the specified eCCA defer period, the eNB determines (at 606) if N=0, which means that the backoff counter has counted down to zero. If N is greater than 0, the eNB senses (at 608) the channel for one eCCA slot duration, which is a specified duration. An eCCA slot refers to a time slot having a specified duration for the backoff procedure.

The eNB next determines (at 610) if an idle eCCA slot (an interference free time slot) has been detected. If not, the eNB returns to task 604. However, if an idle eCCA slot has been detected (at 610), then the backoff counter decrements (at 612) the value of N, and returns to task 606.

If the backoff counter has decremented down to zero, as detected at 606, the eNB ends (at 614) the backoff procedure for UE1. When the backoff procedure for UE1 ends, the eNB can again consider UE1 in UL scheduling decisions.

By using the foregoing process, the eNB ensures that a UE that failed LBT would appear to other contending nodes around the UE as if that UE entered a backoff state from the UL transmission perspective. The foregoing process ensures that a scheduled UE shares the medium in a fairer way with other UEs such as Wi-Fi nodes around the UE.

Further Details of Sensing Procedure at the eNB

As discussed above in connection with FIG. 6, the backoff procedure performed by the eNB on behalf of the UE includes multiple instances of the eNB assessing the status of a channel to determine whether the channel is busy or idle. With a traditional or legacy backoff procedure, the channel is sensed as idle when there is no other transmission detected above the CCA threshold. In some example implementations, the backoff procedure of FIG. 6 can also use the same criterion to determine the status of a channel.

In other examples, the backoff procedure of FIG. 6 can classify a channel as idle even when the presence of particular scheduled/non-interfering transmissions is detected. Certain non-interfering transmissions can occur concurrently over the air (e.g. two UEs scheduled on different UL resource blocks (RBs) within the system bandwidth are orthogonal in the frequency-domain and hence do not mutually interfere). In general, at a sensing node (such as the eNB), if a first transmitting node transmitting on a channel would not have created substantial interference to the reception of a transmission on the channel from a second transmitting node, then the sensing node can treat the channel as clean or idle for the second transmitting node even when the transmission from the first transmitting node is detected.

From the eNB's perspective, when executing the backoff procedure on behalf of a given UE (say UE1), a channel is detected as idle (tasks 608 and 610 in FIG. 6) in the presence of a transmission from a given node, as long as the transmission is non-interfering—i.e. as long as the eNB determines that the detected transmission would not have interfered with the transmission from UE1.

In some implementations of the present disclosure, a given eNB can consider an eCCA slot as idle (task 610 in FIG. 6) in any or some combination of the following cases:
No transmission is detected in the eCCA slot above CCA threshold.
A transmission above the CCA threshold is detected in the eCCA slot, but the detected transmission is from a known "friendly" or non-interfering transmitter. A transmission from a friendly or non-interfering transmitter may include any or some combination of the following transmissions:
A transmission from a downlink transmitter of the given eNB;
A transmission from one of the scheduled UL UEs as scheduled by the given eNB;
A transmission from a known cooperating, non-interfering transmitter, where such a transmission can include:
A transmission from neighboring eNBs connected to the given eNB via an interface through which fast control signaling can be exchanged to enable cooperative transmissions to mitigate mutual interference; or
A transmission from any UEs served by such neighboring eNBs.

In some examples, cooperating, non-interfering transmitters may include an indication identifying them as non-interfering transmissions to facilitate the above. In addition or alternatively, these transmissions may be detected based on a known scrambling sequence or any other known characteristic associated with these transmissions.

An eNB that considers an eCCA slot having a non-interfering transmission as an idle ECCA slot is able to count down the backoff counter more quickly during a backoff operation performed on behalf of a UE than in the traditional or legacy case where an eCCA slot is considered idle only if there is no transmission within the eCCA slot above the CCA threshold. The modified sensing procedure that considers an eCCA slot having a non-interfering transmission as an idle ECCA slot essentially takes into account the fact that the serving eNB and any non-interfering transmitters are not independently contending for the channel access (i.e. they will not interfere with each other's transmissions) and hence the backoff procedure does not have to distinguish these in the channel access mechanism to ensure fairness.

Figure 7:
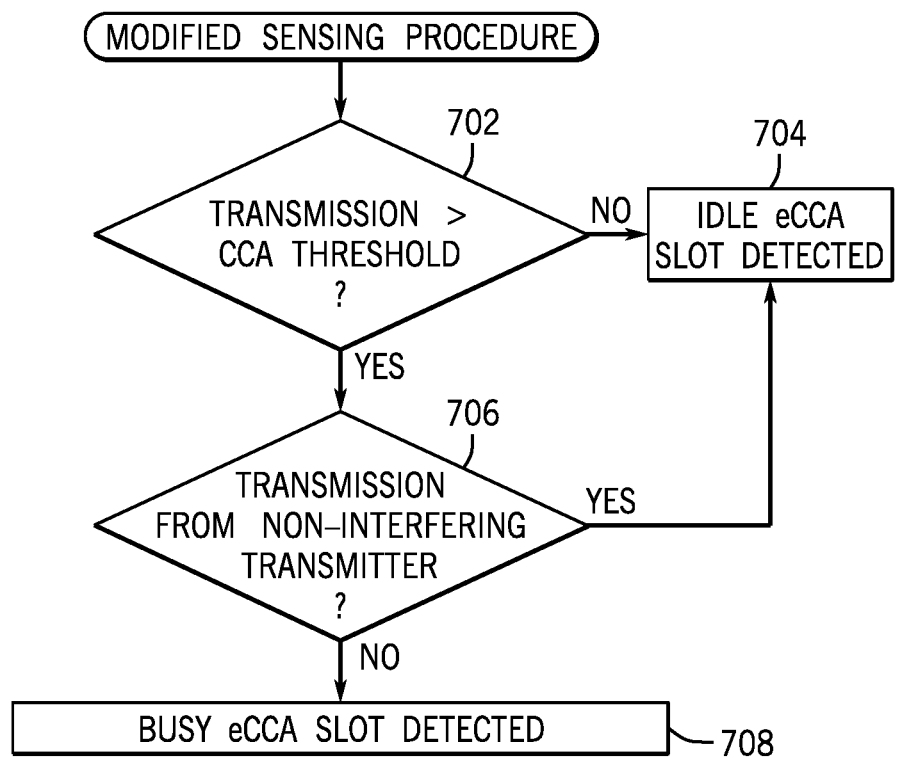
FIG. 7 is a flow diagram of a modified sensing procedure, according to further implementations.

FIG. 7 is a flow diagram of the modified sensing procedure that considers an eCCA slot having a non-interfering transmission as an idle eCCA slot. The modified backoff procedure of FIG. 7 is performed by an eNB on behalf of a UE. The modified sensing procedure of FIG. 7 can correspond to task 610 in FIG. 6.

The eNB determines (at 702) whether there is a transmission in an eCCA slot with power above the CCA threshold. If not, then the eNB indicates (at 704) that an idle eCCA slot is detected.

If the transmission in the eCCA slot is above the CCA threshold, then the eNB determines (at 706) whether the transmission is from a non-interfering transmitter. If so, then the eNB indicates (at 704) that an idle eCCA slot is detected.

If the eNB determines (at 706) that the transmission is not from a non-interfering transmitter, then the eNB indicates (at 708) that a busy eCCA slot is detected.

Explicit Indication of Channel Sensing Status to the eNB

As an alternative or as a complement to other solutions discussed herein, a UE can send an explicit indication of an LBT state (i.e. whether an LBT check has failed or succeeded) to an eNB. Providing such an explicit indication can help improve the reliability of detection of the UE's status at the eNB (when compared to an implicit detection of the LBT state as discussed above). Providing the explicit indication can be used to address Issue 1 discussed above.

An LBT state indication can be sent by a UE to an eNB upon detecting one or more of the following:
The UE failing an LBT check due to the UE detecting a busy channel (e.g. in response to receiving an UL grant, the UE performs an LBT check and detects an ongoing transmission above a CCA threshold).
The UE detecting an idle channel e.g. after previously failing an LBT check.
The UE detecting an event that results in a change in the UE's LBT state.
The UE detecting a change in one or more of the parameters that govern the UE's LBT state, e.g.
reset or expiry or change (e.g. beyond a threshold) of a counter such as a backoff counter at the UE,
change (e.g. beyond a threshold) of a contention window length.

The LBT state indication can be sent by using any of various different mechanisms. For example, the UE can transmit a message or an indication on a licensed carrier or another unlicensed carrier. Examples of messages can include any or some combination of the following:
An RRC message.
A MAC control element, such as
a buffer status report (BSR), or
a new MAC control element.
A physical layer indication, such as
an SR,
a PUCCH ACK/NACK, or
a CQI indication (e.g. using a specific code-point).

In general, it may be the case that new messages or indications are used for providing the LBT state indication, or alternatively, existing messages or indications can be reused or modified to convey the LBT state indication to the eNB. A new message, a new indication, or a new control element can refer to a message, an indication, or a control element that is not specified in current standards governing mobile or wireless communications, but which may or may not be specified in later standards. An existing message, an existing indication, or an existing control element can refer to a message, an indication, or a control element that is specified in current standards governing mobile or wireless communications.

Upon receiving the LBT state indication, the eNB can take various actions, including any or some combination of the following.
The eNB can control scheduling decisions relating to UL resources (which can address Issues 1 and 2 discussed above), where controlling scheduling decisions can include any or some combination of the following:
refraining from scheduling an UL resource for the UE,
scheduling an UL resource for the UE (e.g. after previously refraining from scheduling an UL resource for the UE), or
scheduling the UE on another UL carrier.

scheduling another UE instead of the UE indicating a channel busy state (i.e. a failing LBT or going into a backoff state)

The eNB can update an LBT state for the UE at the eNB (to address Issue 1), such as by reset or expiry or change of counters such as a backoff counter at the eNB.

The eNB can assign or update a hidden node status at the eNB (to address Issue 2). This may be used at the eNB to:
  select a carrier or channel at the eNB—i.e. to move the UE to a different carrier, or to schedule the UE on a different carrier when a hidden node issue is detected,
  control or update the LBT technique (or its governing parameters) used at the UE or for the UE. This can allow the eNB to optimize the LBT technique used according to the detected radio environment as described further below.

Figure 8:
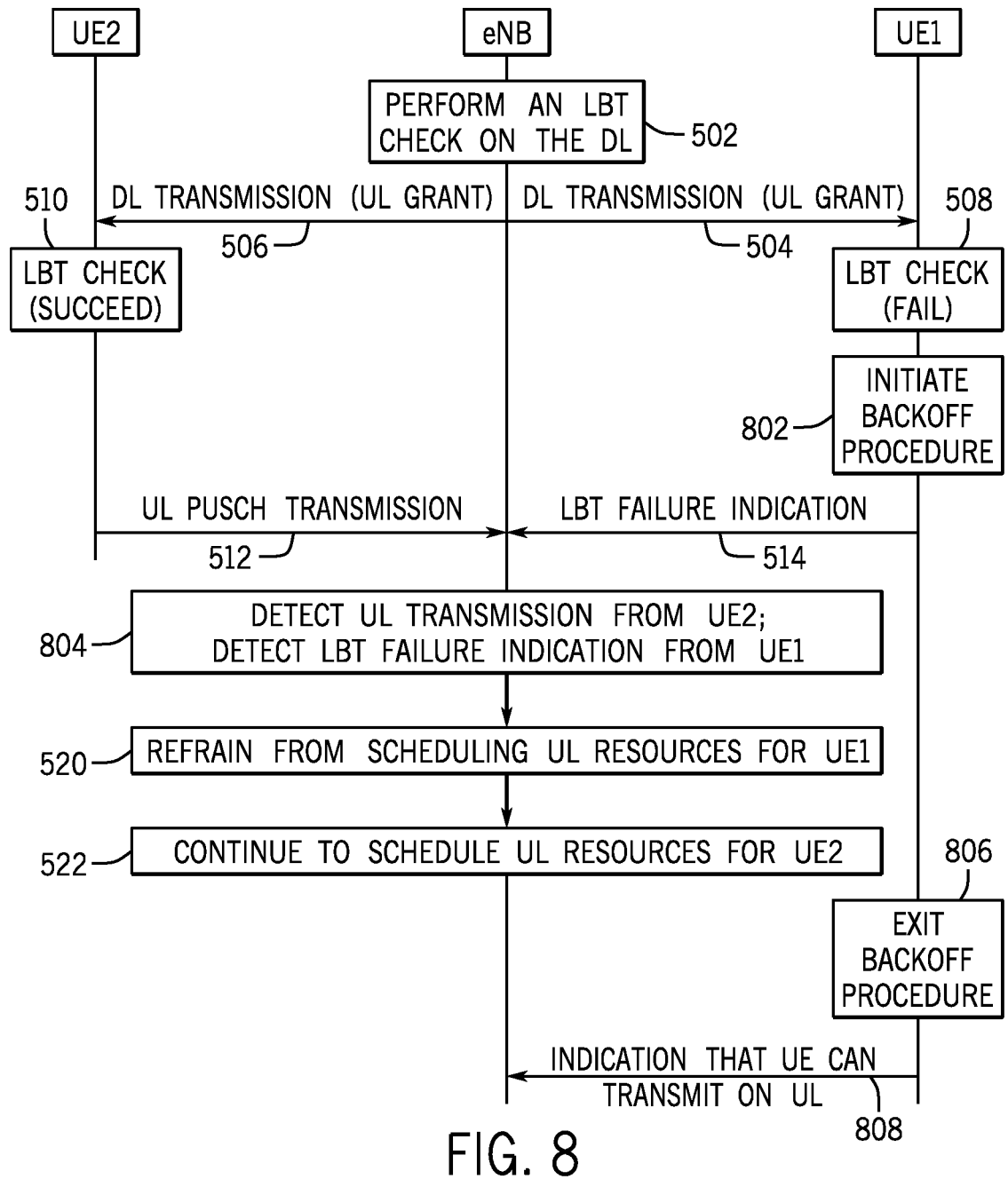
FIG. 8 is a message flow diagram of another example process that involves a wireless access network node and user equipments (UEs), according to further implementations.

FIG. 8 is a message flow diagram of a process performed by an eNB, UE1, and UE2, according to further implementations. The process of FIG. 8 includes various tasks of FIG. 5 discussed above, where such tasks are assigned the same reference numerals as in FIG. 5.

In the FIG. 8 process, in response to failure of the LBT check (at 508), UE1 itself initiates (at 802) a backoff procedure, in contrast to the FIG. 5 process, where the eNB initiates a backoff procedure on behalf of UE1. While executing the backoff procedure, UE1 does not transmit any data on the UL of the unlicensed carrier to which the eNB has provided an UL grant. If a subsequent UL grant on the unlicensed UL carrier is received by the UE, the UE ignores such a grant as long as it is in the backoff state.

UE1 instead may transmit (at 514) an optional LBT failure indication to the eNB, where this LBT failure indication is one of the explicit LBT state indications discussed above.

The eNB detects (at 804) the UL transmission from UE2, and further detects (at 804) the LBT failure indication from UE1. In response to detecting the LBT failure indication from UE1, the eNB refrains (at 520) from scheduling UL resources of the associated unlicensed carrier for UE1 until the backoff procedure ends. Note that the eNB will refrain from scheduling UL resources for UE1 again (or equivalently bar the UE1 from being scheduled on the UL) until the eNB receives a further indication from UE1 indicating that UE1 has exited the backoff procedure. Note that the eNB may also be aware of the fact that a UE in backoff state will ignore and refrain from transmitting on the corresponding UL carrier as long as the UE is in the backoff state. Hence, any UL grants transmitted for scheduling UL transmissions on this carrier will be wasted and ideally an eNB would hence refrain from further transmitting UL grants for such a UE on the corresponding UL carrier until the eNB receives an indication that the UE has exited the backoff procedure. An alternative implementation is for the eNB to speculatively transmit UL grants knowing that the UE will use them when the UE eventually exits the backoff state. This comes at the cost of additional DL signaling and also potentially wasted granted UL resources. However, this may avoid the explicit signaling of UE exiting the backoff state.

Now, considering the case of UE2 in FIG. 8, since the eNB detected the PUSCH transmission from UE2, the eNB continues (at 522) to schedule UL resources for UE2.

As part of the backoff procedure, UE1 may generate a random number N, and initiate the backoff procedure. During the backoff time, UE1 decrements the number N as discussed further below. The process of counting down the backoff counter at UE1 is similar to that discussed above in connection with FIG. 6, except the countdown is performed at UE1 instead of at the eNB. When the backoff counter value (N) reaches zero, UE1 exits (at 806) the backoff procedure.

Upon exiting from the backoff procedure, if there is data in the UL buffer of UE1, UE1 transmits (at 808) an indication to the eNB indicating that UE1 is again able to perform UL transmissions on the unlicensed carrier. This indication may also indicate either implicitly or explicitly that the UE has exited the backoff state. The UE may also send such an indication just before actually exiting the backoff state—for instance when the backoff timer value reaches a predetermined threshold or falls below a predetermined threshold value. This early transmission of such an indication will help in reducing the potential latency for uplink traffic but comes at a cost that potentially the backoff timer may not expire when the next uplink grant is received by the UE and is hence a tradeoff between latency and potential excessive usage of uplink and or downlink resources in the cell. UE1 can provide this indication using any of the following:

Using a scheduling request (SR) transmitted on the PCell:
  The SR may in this case be modified to carry additional information to indicate to the eNB that UE1 is able to transmit again on the unlicensed carrier (i.e. UE1 exited the backoff procedure).
  Alternatively, different SR resources or partitions may be used to distinguish between legacy SR and an SR indicating that UE1 is able to transmit again on the unlicensed carrier (it may be possible for the SR resources to be segregated or partitioned and to associate each SR resource or partition to a particular access cause to enable UE1 to indicate a cause for UL access during SR).

Using an SR on the unlicensed carrier of the secondary cell (SCell):
  While in the backoff state, UE1 may be precluded from transmitting any control signaling such as an SR (both SR on the PUCCH or SR on the Random Access Channel (RACH) based SR). When UE1 exits the backoff procedure, the UE is allowed again to transmit on the next available SR resource on the unlicensed SCell carrier to indicate to the eNB that UE1 has exited the backoff procedure.

Using a dedicated control signal on the SCell:
  A new short control signal which may be transmitted without performing an LBT check as per regulatory requirements may be defined to enable UE1 to transmit the indication that UE1 can again transmit on the SCell.

Using a new RRC message:
  A new RRC message may be used to explicitly indicate to the eNB that UE1 has exited the backoff procedure. This message may be transmitted on the PCell or SCell.

Using a new MAC control element:
  A new MAC control element may be used to indicate to the eNB that UE1 has exited the backoff procedure and this new MAC control element may be transmitted on the PCell or the SCell.

In general, as an alternative to using a new message or a new indication, it is also possible to reuse or modify existing messages or indications, or to add new fields or extensions to the existing messages or indications.

The backoff procedure performed at UE1 includes multiple instances of UE1 assessing the status of a channel to determine whether the channel is busy or idle. With a traditional or legacy backoff procedure, the channel is sensed as idle when there is no other transmission detected above the CCA threshold. In some example implementations, the backoff procedure of UE1 can also use the same criterion to determine the status of a channel.

In other examples, the backoff procedure of UE1 can classify a channel as idle even when the presence of particular scheduled/non-interfering transmissions is detected.

When executing the backoff procedure at UE1, a channel is detected as idle in the presence of a transmission from a given node, as long as the transmission is non-interfering—i.e. as long as UE1 determines that the detected transmission would not have interfered with the transmission from UE1.

In some implementations of the present disclosure, UE1 can consider an eCCA slot as idle in any or some combination of the following cases:

No transmission is detected in the eCCA slot above CCA threshold.

A transmission above the CCA threshold is detected in the eCCA slot, but the detected transmission is from a known non-interfering transmitter. A transmission from a non-interfering transmitter may include any or some combination of the following transmissions:
  a transmission from the serving eNB (the eNB serving UE1);
  a transmission from one of the scheduled UL UEs as scheduled by the serving eNB, which may be detected by the UE based on:
    a known cell-specific (or eNB specific) field included in the UL transmissions from the UEs belonging to a cell of the serving eNB, or
    a cell-specific scrambling code used on UL signals such as the Demodulation Reference Signal (DMRS) in PUSCH;
  a transmission from a known cooperating, non-interfering transmitter, where such a transmission can include:
    a transmission from neighboring eNBs connected to the serving eNB via an interface through which fast control signaling can be exchanged to enable cooperative transmissions to mitigate mutual interference; or
    a transmission from any UEs associated with such neighboring eNBs. In some examples, cooperating, non-interfering transmitters may include an indication identifying them as non-interfering transmissions to facilitate the above. In addition or alternatively, these transmissions may be detected based on a known scrambling sequence or any other known characteristic associated with these transmissions.

A UE that considers an eCCA slot having a non-interfering transmission as an idle ECCA slot is able to count down the backoff counter more quickly during a backoff operation performed at the UE than in the traditional or legacy case where an eCCA slot is considered idle only if there is no transmission within the eCCA slot above the CCA threshold. The modified sensing procedure that considers an eCCA slot having a non-interfering transmission as an idle ECCA slot essentially takes into account the fact that the UE and any non-interfering transmitters are not independently contending for the channel access (i.e. they will not interfere with each other's transmissions) and hence the backoff procedure does not have to distinguish these in the channel access mechanism to ensure fairness.

The modified sensing procedure at the UE is similar to that depicted in FIG. 7.

Reception of UL Grant and Aspects Related to UL/DL Framing

In a scheduled system, the eNB transmits UL grants allowing transmissions from UEs on the scheduled UL subframes. If the UL and DL are operated using time division duplexing (TDD) (in other words, the UL and DL are separated in different time slots), the UL grants sent by the eNB and the scheduled UL transmissions from the UEs are on the same carrier frequency. In this case, the eNB performs an LBT check prior to sending the UL grant on the DL. FIG. 3 shows an example where the eNB performs an LBT check (at 300) prior to transmission of UL grants in DCI messages 1 and 2 to UE1 and UE2, respectively.

Alternatively, an LBT check at the eNB may be skipped in the case of cross carrier scheduling where the scheduling carrier (DL) happens to be in licensed spectrum.

As shown in FIG. 3, upon receiving the UL grant and prior to transmitting on the UL, each UE (UE1 or UE2) executes an LBT check to determine if there are any transmissions detected above the CCA threshold at the UE. Since one of the objectives of LBT is to detect the presence of transmissions from other (unscheduled/foreign system) nodes, there should be a pause or a gap (e.g. 302) in transmission in the system (i.e. no transmissions from any nodes belonging to the same system) during this CCA period. This gap (which may be referred to as a "CCA gap") may be created by not transmitting during part of a scheduled transmission (either in UL or DL). For example, a gap in transmission (in which an LBT check can be performed) may be created by refraining from transmitting on one or more orthogonal frequency-division multiplexing (OFDM) symbols belonging to a given subframe. These OFDM symbols may belong to the beginning of a subframe or may be part of the end of a subframe.

As depicted in FIG. 3, it can be seen that such a gap does not have to be provided if the same transmitting node is transmitting on consecutive subframes. Specifically, as shown in FIG. 3, this means that all the consecutive DL subframes from the eNB can be transmitted without any CCA gap between the DL subframes. Avoiding CCA gaps between consecutive subframes in the DL can improve the spectral efficiency of DL transmissions. Similarly, CCA gaps can also be potentially avoided for the UL if the same UE (or set of UEs) is transmitting across multiple consecutive subframes. In order to facilitate the contiguous transmission across consecutive subframes without CCA gaps in case of UL, the eNB can explicitly indicate to the scheduled UEs whether to skip or to include the CCA gaps in the UL subframes. For instance if the same UE or the same set of UEs is scheduled on consecutive subframes in the UL, then the eNB can include an explicit indication in the DL indicating that these UEs may skip CCA gaps in the UL between the consecutive subframes.

In general, the eNB, after obtaining access to the channel, may opt to share the transmission opportunity (TXOP) the eNB has gained with one or more UEs under the eNB's control. This may be viewed as analogous to uplink scheduling within the eNB's TXOP. In such a shared TXOP, there is therefore a DL phase and an UL phase. During the DL phase, the eNB may transmit a grant ("UL assignment") to schedule a particular UE to transmit during the UL phase.

In the current LTE system, a delay (e.g. 4 milliseconds or ms) exists between the transmission of the UL assignment message on DL, and the actual UL transmission itself. This delay can be referred to here as $\Delta_{UL\_grant}$. If TXOP sharing is to be used, the presence of such a delay places a restriction on the minimum duration of the TXOP; that is, if the TXOP is shorter than $\Delta_{UL\_grant}$, then TXOP sharing is not possible.

Therefore, if the length of the TXOP, i.e. the total transmission duration of the DL phase (the eNB's transmission) and the following uplink phase (i.e transmissions from all the scheduled UEs) is greater than a predetermined threshold (e.g. greater than $\Delta_{UL\_grant}$ or a value derived therefrom), as may be the case in some jurisdictions, the eNB may be allowed to perform the LBT (e.g. Category 4 LBT) on behalf of the UEs the eNB wishes to schedule for UL. In other words, in such cases, the UEs may either skip full LBT or perform a reduced LBT according to Category 2 or Category 3 LBT, for example. However, if the total transmission duration (i.e. TXOP) is smaller than the predetermined threshold (e.g. smaller than $\Delta_{UL\_grant}$ or a value derived therefrom), then such an exception for UE to skip LBT or perform reduced LBT is not allowed. Since the length of the DL phase and UL phase is variable (and may include transmissions to/from UEs other than the UE itself), the UE has to know whether the UE's transmission falls within the total allowed eNB's TXOP duration or not. To enable this, the eNB may explicitly indicate to the UE to either perform full LBT or to perform a reduced/No LBT.

Alternatively, an implicit approach, for example based on a rule, may be employed by the UE (e.g. based on one or more of the $\Delta_{UL\_grant}$, the time of arrival of the UL assignment within the TXOP, the duration or a maximum duration of the TXOP, and the actual duration of the UL transmission), in order to derive whether full LBT, or reduced/no LBT should be employed. It should be noted that this involves the UE being aware of the start of the eNB's TXOP. Where this is not possible, the explicit approach mentioned above can be employed.

In general, the eNB may explicitly indicate to the UE whether to perform full LBT or reduced/no LBT, such as based on one or more of the following:
1) the start of the TXOP ($T_0$),
2) a duration of the eNB's TXOP ($\Delta_{TXOP}$),
3) the timing of the UL assignment message ($T_g$),
4) the delay ($\Delta_{UL\_grant}$) between the UL assignment message and the scheduled UL transmission,
5) the timing of the scheduled UL transmission for the UE ($T_{UL}$),
6) the duration of the UL transmission ($\Delta_{UL\_tx}$).

As an example, assume that $T_{UL}=T_g+\Delta_{UL}$_grant, then:
If ($T_{UL}+\Delta_{UL\_tx}$) (i.e. the end of the UL transmission) falls within the eNB's allowed TXOP (i.e. $T_0 \leq (T_{UL}+\Delta_{UL\_tx}) \leq (T_0+\Delta_{TXOP})$), the UE performs a reduced/no LBT (either as a result of receiving explicit signaling from the eNB, or as the result of determining this condition itself;
Else (i.e. at least a part of the UEs transmission would fall outside of the eNB's TXOP), the UE performs a full LBT (again, either as a result of receiving explicit signaling from the eNB, or as the result of determining this condition itself).

This explicit indication may be included in a message, such as a DCI message of the PDCCH conveying the UL grant. If included in the PDCCH grant as proposed, the eNB can dynamically control UE behavior for each UL transmission. If such a dynamic control does not have to be performed, then a semi-static indication included in an RRC message or a MAC control element, for example, may be employed.

In summary, the following are various options for accommodating the CCA gaps:
1) The CCA gap is created by not transmitting on one or more OFDM symbols belonging to a subframe.
2) Between two consecutive subframes, a CCA gap may be included, for example, at the start of the second subframe or at the end of the first subframe.
   a. This option of including a CCA gap is employed when a different transmitting node transmits on each of the consecutive subframes.
3) A CCA gap between two consecutive subframes may be skipped (or equivalently, contiguous transmission is performed without CCA gaps) when the same transmitting node (or same set of transmitting nodes) is/are transmitting on both of the consecutive subframes Based on the above, the following observations can be made as depicted in FIG. 3:
In the DL, option 1) above implies that there are no CCA gaps between consecutive DL subframes from the same eNB.
Option 2) implies that there is a CCA gap included at the switching point between the DL phase and the UL phase.
  This is because the transmitting node is different, i.e. the eNB transmits the last DL subframe followed by one or more scheduled UL UEs transmitting on the first UL subframe following the DL phase—these one or more scheduled UL UEs transmitting on the first UL subframe will do LBT check during the CCA gap between the DL phase and the UL phase.
  This CCA gap at the switching point between the DL phase and the UL phase may be included at the end of the last DL subframe or at the beginning of the first UL subframe.
Combining options 1) and 2) can imply that if the same UE or same set of UEs is/are transmitting across consecutive UL subframes, then a CCA gap is not included between these subframes.
  An eNB may signal whether or not to include such a CCA gap via explicit signaling as mentioned above.

Adjusting the LBT Technique

The LBT technique used can be adjusted based on whether or not there are hidden nodes.

If, from the eNB's perspective, there are no hidden nodes for a UE on a specific carrier or within the network (i.e. every transmitting node that is within CCA range of the UE is also within the CCA range of the eNB), then the UE does not have to perform LBT or backoff procedures prior to transmitting, so long as the eNB performs its own LBT check before sending an UL grant.

In general, the UE adopts an LBT technique based on the carrier on which the UL grant is received and/or based on the existence of hidden nodes in the system. Specifically:
If the eNB does not perform an LBT check before transmitting an UL grant, then the UE has to perform LBT similar to a category 4 LBT before UL transmissions. A category 4 LBT is an LBT with random backoff within a variable-sized contention window (e.g. one that grows based on each successive retry).
  When the scheduling carrier (i.e. DL carrier in case of cross carrier scheduling) is in the licensed spectrum, then the UE adopts an LBT technique including backoff, such as a category 3 LBT or category 4 LBT. A category 3 LBT is an LBT with random backoff within a fixed-size time (contention window).
If the eNB performs an LBT check before transmitting an UL grant, then an LBT technique is adopted based on the presence of hidden nodes in the system.
  If hidden nodes are detected then solutions as discussed in the "Channel Sensing and Back-Off Performed in Separate Nodes" section and the "Explicit Indication of Channel Sensing Status to the eNB" section can be adopted.
    Detection of hidden nodes may be performed either by the eNB or by the UE; if the eNB detects hidden nodes, the presence or absence of hidden nodes is signaled to UEs.

If no hidden nodes are detected, then upon receiving an UL grant, one of the following may be employed:
  Use of defer-only at the UE (i.e. just LBT check but no backoff); with subsequent UE transmission if LBT succeeds. Note, this is implicitly built into the procedures described in the "Channel Sensing and Back-Off Performed in Separate Nodes" section and the "Explicit Indication of Channel Sensing Status to the eNB" section.
  Perform no LBT at the UE, e.g. the eNB may instruct the UE to temporarily skip the LBT check prior to transmitting on the scheduled UL subframes upon detecting that no hidden nodes exist in the system.

If all the transmitting nodes within the CCA range of any of the associated UEs of a given eNB are also within the CCA range of the given eNB, then such a system has no hidden nodes.

Presence of hidden nodes in the system may be detected using any or some combination of the following:

UE based reporting of RSSI to the eNB that the eNB can use to detect the presence of hidden nodes.

The eNB may detect the presence of hidden nodes by detecting that the UE has failed an LBT check subsequent to the eNB sending an UL grant.
  As discussed above, the eNB's detection of the fact that the UE has failed LBT may be done either implicitly by detecting DTX on a scheduled UL PUSCH resource or by receiving an explicit indication indicating failed LBT at the UE.

If the eNB detects presence or absence of hidden nodes in the system, the eNB can send an indication of the presence or absence of hidden nodes to associated UEs. Such indication can be performed using any or some combination of the following:

dedicated signaling, e.g. RRC signaling or MAC control element,
an indication in a broadcast system information,
an indication included in the PDCCH, or
any other indication.

Based on the indication of the presence or absence of hidden nodes, the UEs may choose an appropriate LBT technique as discussed above.

System Architecture

Figure 9:
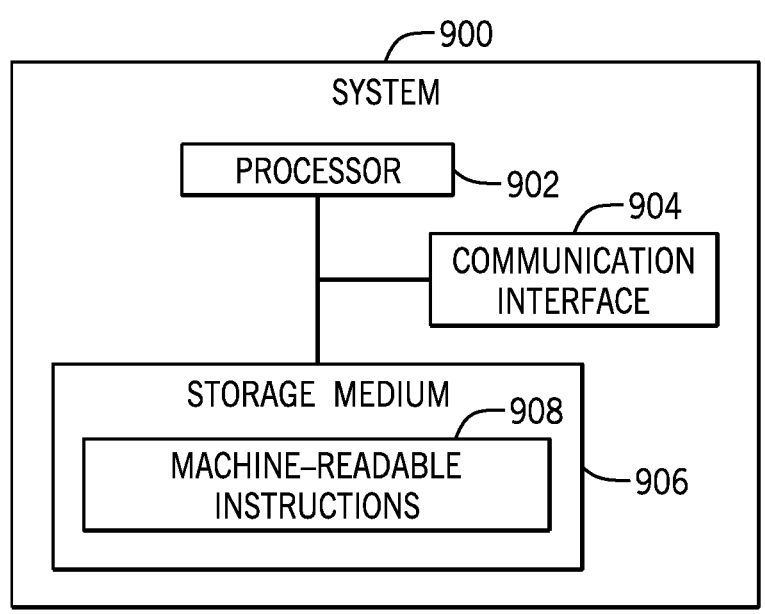
FIG. 9 is a block diagram of an example system according to some implementations.

FIG. 9 is a block diagram of an example system (or network node) 900, which can represent any one of: a UE or a wireless access network node. The system 900 can be implemented as a computing device or an arrangement of multiple computing devices.

The system 900 includes a processor (or multiple processors) 902, which can be coupled to a communication interface (or multiple communication interfaces) 904 to communicate with another entity, either wirelessly or over a wired link. A processor can include a microprocessor, a microcontroller, a physical processor module or subsystem, a programmable integrated circuit, a programmable gate array, or another physical control or computing circuit.

The processor(s) 902 can also be coupled to a non-transitory machine-readable or computer-readable storage medium (or storage media) 906, which can store machine-readable instructions 908 that are executable on the processor(s) 902 to perform various tasks as discussed above.

The storage medium (or storage media) 906 can include one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   transmitting, by a wireless access network node, scheduling information assigning an uplink resource for a user equipment (UE);
   detecting, at the wireless access network node, whether the UE has not transmitted using the assigned uplink resource;
   determining, based on the detecting, that the UE has failed a Listen-Before-Talk (LBT) check at the UE;
   in response to the determining that the UE has failed the LBT check, performing, by the wireless access network node, a backoff process on behalf of the UE; and
   further scheduling and assigning, by the wireless access network node, an uplink resource for the UE.

2. The method of claim 1, wherein the LBT check at the UE comprises the UE detecting an ongoing transmission having a transmit power above a power threshold.

3. The method of claim 1, wherein the detecting comprises the wireless access network node checking an indication of a received power or signal to interference ratio for a transmission of the UE.

4. The method of claim 1, wherein the detecting comprises the wireless access network node performing channel estimation processing based on processing of a demodulation reference signal (DMRS) corresponding to a transmission of the UE.

5. The method of claim 1, wherein the detecting is based on an explicit indication provided by the UE.

6. The method of claim 1, wherein the scheduling information comprises a Downlink Control Information (DCI) message on a Physical Downlink Control Channel (PDCCH) or Enhanced Physical Downlink Control Channel (E-PDCCH).

7. The method of claim 1, wherein the further scheduling is based on the backoff process.

8. The method of claim 1, wherein the backoff process on behalf of the UE comprises maintaining, by the wireless access network node, an uplink timer or counter for the UE.

9. The method of claim 8, wherein the wireless access network node maintains multiple uplink timers or counters for performing backoff processes for respective different UEs.

10. The method of claim 1, wherein the further scheduling involves a category 4 LBT with a variable sized contention window.

11. The method of claim 10, wherein the further scheduling uses the variable sized contention window that grows in length of time with each successive retry before next assigning an uplink resource to the UE.

12. A wireless access network node comprising:
 a communication interface to communicate over a wireless network; and
 at least one processor configured to:
  transmit scheduling information assigning an uplink resource for a user equipment (UE);
  detect whether the UE has not transmitted using the assigned uplink resource;
  determine, based on the detecting, that the UE has failed a Listen-Before-Talk (LBT) check at the UE;
  in response to the determining that the UE has failed the LBT check, perform a backoff process on behalf of the UE; and
  further schedule and assign an uplink resource for the UE.

13. The wireless access network node of claim 12, wherein the LBT check at the UE comprises the UE detecting an ongoing transmission having a transmit power above a power threshold.

14. The wireless access network node of claim 12, wherein the detecting comprises the wireless access network node:
 checking an indication of a received power or signal to interference ratio for a transmission of the UE, or
 performing channel estimation processing based on processing of a demodulation reference signal (DMRS) corresponding to a transmission of the UE.

15. The wireless access network node of claim 12, wherein the detecting is based on an explicit indication provided by the UE.

16. The wireless access network node of claim 12, wherein the scheduling information comprises a Downlink Control Information (DCI) message on a Physical Downlink Control Channel (PDCCH) or Enhanced Physical Downlink Control Channel (E-PDCCH).

17. The wireless access network node of claim 12, wherein the backoff process uses a variable sized contention window.

18. The wireless access network node of claim 12, wherein the backoff process on behalf of the UE comprises maintaining, by the wireless access network node, an uplink timer or counter for the UE.

19. A non-transitory machine-readable storage medium comprising instructions that upon execution cause a wireless access network node to:
 transmit scheduling information assigning an uplink resource for a user equipment (UE);
 detect whether the UE has not transmitted using the assigned uplink resource;
 determine, based on the detecting, that the UE has failed a Listen-Before-Talk (LBT) check at the UE;
 in response to the determining that the UE has failed the LBT check, perform a backoff process on behalf of the UE; and
 further schedule and assign an uplink resource for the UE.

20. The non-transitory machine-readable storage medium of claim 19, wherein the backoff process on behalf of the UE comprises maintaining, by the wireless access network node, an uplink timer or counter for the UE.

* * * * *